Aug. 17, 1926.

W. C. O'BRIEN 1,596,214

DEVICE FOR CLEANING VIGIL LIGHT GLASSES

Filed July 15, 1925

Inventor

Wm C. O'Brien

By Robert Walton

Attorney

Patented Aug. 17, 1926.

1,596,214

UNITED STATES PATENT OFFICE.

WILLIAM C. O'BRIEN, OF BALTIMORE, MARYLAND.

DEVICE FOR CLEANING VIGIL-LIGHT GLASSES.

Application filed July 15, 1925. Serial No. 43,769.

This invention relates to means for melting the wax out of the glasses containing vigil lights, as used in Catholic churches. At present, the residue of wax remaining in the bottoms of vigil light glasses is removed by cutting and scraping tools. The work of cleaning large numbers of glasses is burdensome and time-consuming, and more or less waste occurs by reason of breakage of the glasses, and also injury to person is liable to occur from the broken glass.

In carrying out the invention, I provide a casing having a door at one side and having an electric heater in its upper portion, and arranged horizontally in the casing is a partition having a plurality of circular openings each slightly larger than the internal diameter of a vigil glass at its mouth. Surrounding the openings on the upper side of the partition are ribs for centering the mouths of the glasses over the openings. The partition is spaced from the heater a distance greater than the height of the glasses so that the glasses may be placed in inverted position over the openings in the partition. The partition is also preferably provided with a plurality of smaller openings for permitting the heat to pass from the upper part of the casing to the lower part so that the wax at the mouths of the glasses may be heated. Below the partition is a removable receptacle for the wax from the glasses. When the inverted glasses are placed over the larger openings in the tray and heat is applied, the glasses become warm and the wax melts and drops through the openings into the receptacle below. The emptied glasses are then removed and wiped clean and other glasses are placed over the openings in the partition and the operation is repeated. The partition is in the form of a removable tray, which facilitates placing and removing the glasses, and the receptacle for the wicks is also removable from the casing.

In the accompanying drawing.

Figure 1:
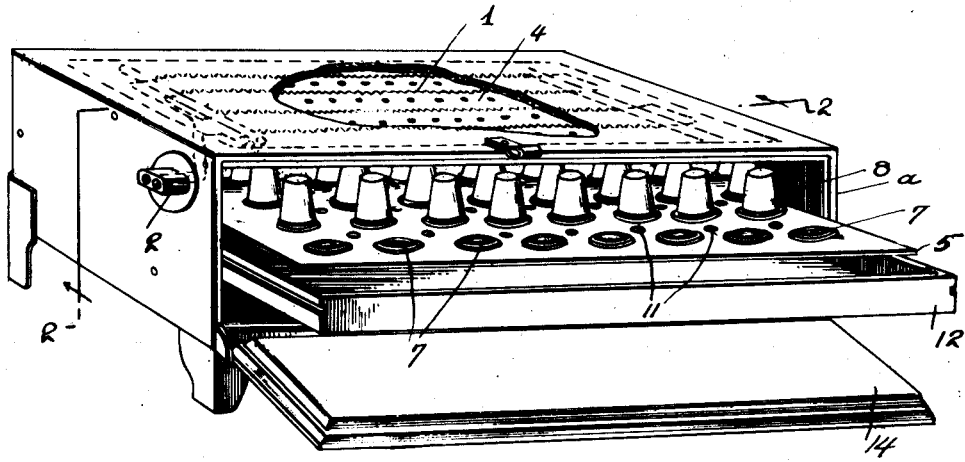
Fig. 1 is a perspective view of the apparatus, showing the partition and receptacle partly removed from the casing and showing glasses over some of the openings in the partition.
Figure 2:
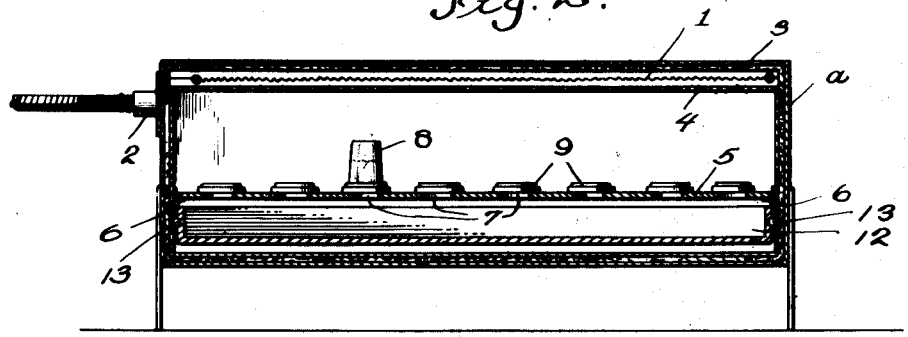
Fig. 2 is a longitudinal section through the apparatus about on the line 2—2 of Fig. 1; and, Fig. 3 is an enlarged detail view showing a part of the partition and one of the vigil light glasses in section, and a part of the wax receptacle in side elevation.
Figure 3:
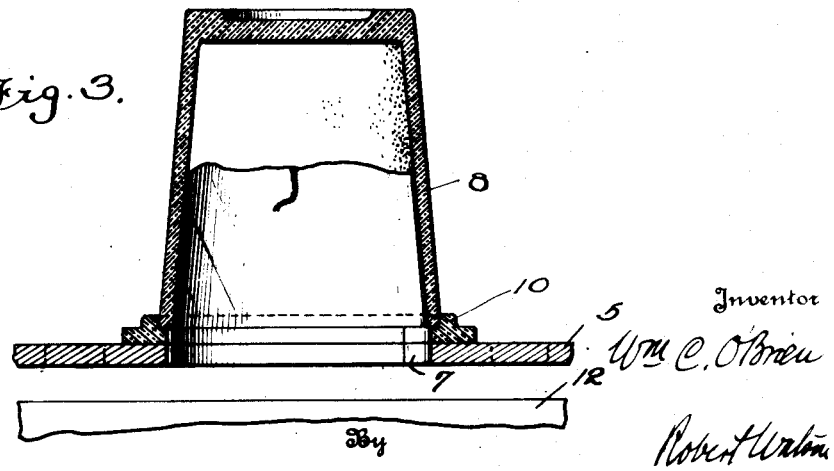

Referring to the drawing, $a$ represents a rectangular casing having in its upper portion an electric heater 1, the terminal plug 2 of which is shown at one side of the casing. The casing has an inner lining 3 of fireproof insulating material, such as asbestos, extending above and around the heater, and below the heater is arranged a perforated plate 4 which protects the operator's hands from coming in direct contact with the heating element. At a suitable distance below the perforated plate 4 is a removable partition or tray 5, supported on guideways 6, at the ends of the casing. This tray has a plurality of circular openings 7, the diameter of each opening being slightly greater than the internal diameter of the mouth of a vigil glass 8. Surrounding the openings 7, on the upper side of the tray, are circular seats 9 for the glasses, each seat having a circular rib 10, for centering the mouths of the glasses over an opening 7. The parts 9—10 may be made integral with the tray, although preferably they are made of suitable molded heat insulating material, and cemented, or otherwise, secured to the body of the tray. The tray is also provided with a plurality of smaller openings 11, for permitting some of the heat from the compartment above the partition to pass through the compartment below the partition. The partition is spaced a suitable distance from the perforated cover for the heater to provide room for the inverted glasses, and to leave a space above the glasses so that the latter will not be close to the heater. Below the partition or tray 5 is arranged a receptacle 12 for the wax which drops from the glasses. This receptacle is in the form of rectangular tray having side and end pieces, and it is slidable into and out of the casing on guides 13. A door 14 is provided on the side of the casing so that the latter may be closed to retain the heat, or opened to remove or replace the partition and wax receptacle.

In operation, the vigil glasses requiring cleaning are placed in inverted positions over the openings 7 on the partition 5, one glass over each opening, and the partition is then slid into the casing and the door is closed to retain the heat. The current is then applied to the heater, and the air in the compartment above the partition is thus gradually heated, and as the glasses become warm the wax loosens from the sides and bottoms of the glasses. Some of the heat passes through the small openings 11 in the lower compartment, and if there is any sticking of the wax at the mouth of a glass, this is soon relieved by the melting of the wax due to the heat below the partition. As soon as the glasses become well warmed, the wax drops from the glasses through the openings 7 into the receptacle in the lower compartment. The door is then opened and the emptied glasses are removed and wiped with a cloth, while still warm, and the receptacle containing the deposited wax may also be removed and emptied. The openings in the partition are then covered with other glasses containing wax which is to be removed, and the partition and wax receptacle are then pushed back into the casing and the door closed, and these glasses are then cleaned in the manner described.

By having the heater above the partition, the heat is applied directly to the bottoms and sides of the glasses and the wax which drops into the receptacle is protected from the direct action of the heat. It is desirable to prevent excessive heating of the removed wax and wicks in the receptacle 12, because of the possible charring of the wicks and burning of the wax and the consequent smoke and odors. By the arrangement described, in which the heater is in the upper part of the casing and the partition is arranged between the heater and the wax receptacle, the wax in the latter is subjected only to a moderate degree of heat, insufficient to cause charring or odors.

Suitable temperature regulating devices will be used in connection with the apparatus, but these devices are not shown as they form no part of the invention.

What I claim is:

1. An apparatus for melting the wax out of vigil light glasses comprising a casing, a partition extending horizontally across the casing and having a plurality of openings each slightly larger in diameter than the interior diameter of one of said glasses at its mouth, said partition having ribs surrounding said openings and forming guides for centering the glasses over the openings, a heater in the casing above the partition and spaced from the same a suitable distance to provide room for the glasses, and a tray in the casing, below the partition, for receiving the wax which drops from the glasses.

2. An apparatus for melting wax out of vigil light glasses comprising a casing, a partition extending horizontally across the casing and having a plurality of openings each slightly larger in diameter than the interior diameter of one of said glasses at its mouth, said partition having ribs surrounding said openings and forming guides for centering the glasses over the openings and having also a plurality of smaller openings for the passage of heat through the partition, a heater in the casing above the partition and spaced from the same a suitable distance to provide room for the glasses, and a tray in the casing, below the partition, for receiving the wax which drops from the glasses.

In testimony whereof I hereunto affix my signature.

WILLIAM C. O'BRIEN.